(12) United States Patent
Schmidt-Schäffer

(10) Patent No.: US 11,905,019 B2
(45) Date of Patent: Feb. 20, 2024

(54) PASSENGER CABIN AREA AND AIRCRAFT HAVING A PASSENGER CABIN AREA

(71) Applicant: AIRBUS OPERATIONS GMBH, Hamburg (DE)

(72) Inventor: Tobias Schmidt-Schäffer, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 144 days.

(21) Appl. No.: 17/181,563

(22) Filed: Feb. 22, 2021

(65) Prior Publication Data

US 2021/0269157 A1    Sep. 2, 2021

(30) Foreign Application Priority Data

Feb. 25, 2020  (DE) ...................... 10 2020 104 880.7

(51) Int. Cl.
  *B64D 11/06*    (2006.01)
(52) U.S. Cl.
  CPC ...... *B64D 11/0604* (2014.12); *B64D 11/0606* (2014.12)
(58) Field of Classification Search
  CPC .... B64D 2011/0084; B64D 2011/0069; B64D 11/0604
  See application file for complete search history.

(56) References Cited

U.S. PATENT DOCUMENTS

| 2,583,960 | A | * | 1/1952 | Murphy | B61D 31/00 105/315 |
| 2,608,366 | A | * | 8/1952 | Jergenson | B64D 11/06 244/118.6 |
| 5,395,075 | A | * | 3/1995 | Sprenger | B64D 11/00 244/129.6 |
| 6,056,239 | A | * | 5/2000 | Cantu | B64D 11/06 244/118.6 |
| 7,083,145 | B2 | * | 8/2006 | Mills | B64D 11/00 244/118.5 |
| 8,925,686 | B2 | * | 1/2015 | Saint-Jalmes | B64D 11/00 244/129.6 |
| 2003/0019976 | A1 | * | 1/2003 | Cheung | B64D 11/0604 244/118.5 |

(Continued)

FOREIGN PATENT DOCUMENTS

| DE | 10 2006 003 585 A1 | 8/2007 |
| DE | 10 2014 205 106 A1 | 9/2015 |

OTHER PUBLICATIONS

German Search Report for Application No. 102020104880 dated Mar. 24, 2022.

*Primary Examiner* — Christopher D Hutchens
(74) *Attorney, Agent, or Firm* — KDW FIRM PLLC

(57) ABSTRACT

A passenger cabin area includes at least one aisle extending along a longitudinal axis of the passenger cabin area, a seating area next to the aisle in the direction of a transverse axis, perpendicular to the longitudinal axis, of the passenger cabin area and in which at least one passenger seat is provided, and a plurality of sleeping berths arranged above the seating area in the direction of a vertical axis, perpendicular to the longitudinal axis and the transverse axis, of the passenger cabin area. Each sleeping berth is accessible from the aisle of the passenger cabin area via a stairway element assigned individually to the sleeping berth.

20 Claims, 16 Drawing Sheets

(56) References Cited

U.S. PATENT DOCUMENTS

| | | | |
|---|---|---|---|
| 2003/0168281 A1* | 9/2003 | Olliges ................... | E04F 11/02 244/118.5 |
| 2005/0178904 A1* | 8/2005 | Mills ..................... | B64D 11/00 244/118.5 |
| 2005/0178909 A1* | 8/2005 | Mills ................... | B64D 11/0604 244/118.6 |
| 2006/0022087 A1* | 2/2006 | Defilla ............... | B64D 11/0641 244/118.5 |
| 2006/0065783 A1* | 3/2006 | Mills ..................... | B64D 11/00 244/118.6 |
| 2007/0164591 A1* | 7/2007 | Doebertin .............. | B64D 11/00 297/245 |
| 2008/0156933 A1* | 7/2008 | Saint-Jalmes .......... | B64D 11/00 182/152 |
| 2008/0302911 A1* | 12/2008 | Warner .................. | B64D 11/00 244/118.6 |
| 2010/0019087 A1* | 1/2010 | Warner .................. | B64D 11/00 244/118.6 |
| 2013/0032668 A1* | 2/2013 | Foucher ................. | B60N 2/01 244/118.6 |
| 2015/0274298 A1 | 10/2015 | Kircher et al. | |
| 2016/0194084 A1* | 7/2016 | Rajasingham ..... | B64D 11/0601 92/15 |
| 2017/0233057 A1 | 8/2017 | Charles et al. | |
| 2020/0180747 A1* | 6/2020 | Behr ........................ | B64C 1/14 |

\* cited by examiner

PASSENGER CABIN AREA AND AIRCRAFT HAVING A PASSENGER CABIN AREA

CROSS-REFERENCE TO RELATED APPLICATION

This application claims priority to German Patent Application No. 10 2020 104 880.7 filed Feb. 25, 2020, the entire disclosure of which is incorporated by reference herein.

TECHNICAL FIELD

The disclosure herein relates to a passenger cabin area, in particular an aircraft passenger cabin area. The disclosure herein also relates to an aircraft equipped with such a passenger cabin area.

BACKGROUND

In modern means of transportation, in particular passenger aircraft, it is of great economic importance to make the best possible use of the space available in a passenger cabin. At the same time, the passengers' stay in the passenger cabin should be as comfortable as possible. Therefore, efforts have been made to equip aircraft passenger cabins with beds or sleeping berths that can be used at least at times as rest areas by the passengers during a long flight.

For example, DE 10 2006 003 585 A1 describes a resting deck, which is arranged in the ceiling area of an aircraft cabin above a passenger seating area and comprises a central aisle extending parallel to a longitudinal axis of the aircraft. The central aisle allows access to a plurality of sleeping cabins which are arranged parallel to one another and the longitudinal axes of which are oriented at an angle to the longitudinal axis of the aircraft.

Furthermore, a sleeping box arrangement having a plurality of sleeping boxes arranged alongside one another and/or one above another is known from DE 10 2014 205 106 A1. The sleeping box arrangement is arranged in an aircraft passenger cabin in such a way that respective longitudinal axes of the sleeping boxes extend perpendicularly to a longitudinal axis of the aircraft and access openings of the sleeping boxes adjoin a central aisle provided in the aircraft passenger cabin.

SUMMARY

The disclosure herein is based on the object of providing a passenger cabin area, in particular an aircraft passenger cabin area, in which the space available in a passenger cabin is used very well and affords a high degree of comfort to passengers staying in the passenger cabin area. Furthermore, the disclosure herein is directed to the object of specifying an aircraft equipped with such a passenger cabin area.

This object is achieved by a passenger cabin area and an aircraft as disclosed herein.

A passenger cabin area, which may be configured in particular in the form of an aircraft passenger cabin area, comprises at least one aisle extending along a longitudinal axis of the passenger cabin area. Furthermore, the passenger cabin area comprises a seating area, which is arranged next to the aisle in the direction of a transverse axis, perpendicular to the longitudinal axis, of the passenger cabin area. At least one passenger seat is provided in the seating area. Preferably, a plurality of passenger seats, which may be arranged in a plurality of rows positioned one after another, are arranged in the seating area. The passenger seats may be configured as conventional Economy Class seats and have a sitting element and a backrest element that is pivotable relative to the sitting element between an upright position and a slightly reclined position. Alternatively, however, the passenger seats may also be embodied as Business Class seats, which are adjustable between an upright position and a sleeping position, in particular a flat bed position.

Lastly, the passenger cabin area comprises a plurality of sleeping berths, which are arranged above the seating area in the direction of a vertical axis, perpendicular to the longitudinal axis and the transverse axis, of the passenger cabin area. Longitudinal axes of the sleeping berths may extend substantially parallel to the longitudinal axis of the passenger cabin area or be inclined at an angle <45°, preferably less than 30° and particularly preferably less than 15°, to the longitudinal axis of the passenger cabin area. Each sleeping berth is accessible from the aisle of the passenger cabin area via a stairway element assigned individually to the sleeping berth. In other words, in the passenger cabin area, the number of sleeping berths corresponds to the number of stairway elements, such that each sleeping berth can be reached by way of its "own" stairway element assigned to it.

As a result, each of the sleeping berths is accessible in an easy and convenient way. Furthermore, as a result of the sleeping berths being arranged above the seating area, there is no loss of space for passenger seats. Rather, an existing passenger seat configuration can be retained in the passenger cabin area and the passenger cabin area can be merely additionally equipped with the sleeping berths and the stairway elements. The passenger cabin area layout that is described here therefore allows very good exploitation of the space that is available only to a limited extent in a passenger cabin. Furthermore, retrofitting passenger cabin areas that are already in use with sleeping berths and stairway elements is also possible in a relatively simple manner.

The sleeping berths can be arranged in the passenger cabin area for example in the place of overhead compartments in the ceiling area of the passenger cabin area. When the passenger cabin area is an aircraft passenger cabin area, the sleeping berths can be arranged particularly easily above a seating area that is positioned centrally in the aircraft passenger cabin and is flanked on both sides by respective aisles extending along the longitudinal axis of the passenger cabin area. The sleeping berths can then be arranged next to one another in pairs for example in the direction of the transverse axis of the passenger cabin area. Additionally or alternatively, a plurality of sleeping berths can be arranged one after another in the direction of the longitudinal axis of the passenger cabin area.

At least one of the stairway elements comprises preferably a support element extending in the direction of the vertical axis of the passenger cabin area. Furthermore, the stairway element may comprise a plurality of steps, which are fastened to the support element and extend, at least in a ready-for-use operating state of the support element, substantially perpendicularly from a support face of the support element. Via the steps, a passenger can then climb from the aisle of the passenger cabin area into the elevated sleeping berth.

At least one portion of the support element may be arranged next to a passenger seat, provided in the seating area, in the direction of the transverse axis of the passenger cabin area. Additionally or alternatively, at least one portion of the support face of the support element may face the aisle. In particular, at least one portion of the support face of the support element may extend in a plane that extends substantially perpendicularly to the transverse axis of the passenger cabin area. This portion of the support face may immediately adjoin the aisle, but also be arranged in a manner offset from the aisle, in the direction of the transverse axis of the passenger cabin area, in an "interior" of the seating area.

The stairway element may be provided with steps that are connected only rigidly to the support element. If desired, however, at least one of the steps may be fastened to the support element so as to be movable between a resting operating state and a use operating state. The step fastened in a movable manner to the support element may extend, in its resting operating state, substantially parallel to the support face of the support element. In its use operating state, the step fastened in a movable manner to the support element may, by contrast, extend substantially perpendicularly to the support face of the support element.

For example, the at least one step may be pivotable about a pivot axis between its resting operating state and its use operating state. The pivot axis may extend substantially parallel to a longitudinal axis of the step in a peripheral portion, facing the support face of the support element, of the step. In principle, it conceivable to configure all of the steps fastened to the support element as steps which are movable between a resting operating state and a use operating state. Preferably, however, only some, preferably the top-most steps fastened to the support element are configured in a movable manner. In the context of this application, the "top-most" steps should be understood as being those steps that are located closest to the sleeping berth, or are farthest away from a floor of the passenger cabin area.

In a passenger aircraft, the aisle has to be less wide in an area close to the floor than in an area located for example at shoulder height of a passenger standing in the aisle. A movable configuration in particular of the top-most steps fastened to the support element is therefore advantageous in particular when the support element has a support-face portion that immediately adjoins the aisle and is provided with steps. The steps configured in a movable manner can be swung into their resting operating state when the sleeping berth associated with the stairway element is not in use, with the result that the width of the aisle is increased at least to the required size in the region of the steps configured in a movable manner.

In principle, it is conceivable for all the steps fastened to the support element to have the same depth in a direction perpendicular to the support face of the support element at least in a ready-for-use operating state of the stairway element. Alternatively, however, the stairway element may also have steps that have different depths in the direction perpendicular to the support face of the support element at least in a ready-for-use operating state of the stairway element. In particular, at least in a ready-for-use operating state of the stairway element, the top-most steps fastened to the support element may have a smaller depth than steps fastened to the support element farther down in an area of the support element close to the floor. Such a configuration of the steps fastened to the support element is in turn particularly advantageous when the support element has a support-face portion that immediately adjoins the aisle and is provided with steps, since the less deep steps then allow a larger free aisle width in an aisle area adjacent to the steps.

In a variant of the passenger cabin area, which may be configured in particular in the form of an Economy Class passenger cabin area, the support element is formed in a substantially panel-like manner and has a substantially flat support face. The support element can then be positioned for example next to a passenger seat arranged in the seating area such that the support element extends along a "boundary" between the seating area and the aisle, wherein the support face, bearing the steps, of the support element faces the aisle. A support element formed in a substantially panel-like manner preferably has, in the direction of the longitudinal axis of the passenger cabin area, a dimension that is not substantially greater than a dimension of the passenger seat, arranged next to the support element in the direction of the transverse axis of the passenger cabin area, in the direction of the longitudinal axis of the passenger cabin area. As a result, it is possible to ensure that the support element does not impede access to the passenger seat positioned next to the support element.

In an alternative embodiment, the support element may comprise a first support-element portion with a first support-face portion and a second support-element portion with a second support-face portion. The first support-face portion may form an angle of less than 45°, preferably an angle of less than 30°, particularly preferably an angle of less than 15°, with the transverse axis of the passenger cabin area. The first support-face portion may also extend substantially parallel to the transverse axis of the passenger cabin area. By contrast, the second support-face portion may form an angle of less than 45°, preferably an angle of less than 30°, particularly preferably an angle of less than 15°, with the longitudinal axis of the passenger cabin area. The second support-face portion may also extend substantially parallel to the longitudinal axis of the passenger cabin area.

The first support-face portion of the first support-element portion forms preferably an angle of 70 to 110°, in particular an angle of 80 to 100°, and particularly preferably an angle of about 90°, with the second support-face portion of the second support-element portion. When the stairway element has a support element with a first support-element portion, the first support-face portion of which forms an angle of 70 to 110°, preferably an angle of 80 to 100°, and particularly preferably an angle of about 90°, with a second support-face portion of a second support-element portion, the stairway element forms a kind of "spiral stairway", which is both space-saving and also convenient to use. A passenger cabin area equipped with such stairway elements is preferably configured as a Business Class passenger cabin area.

The stairway element may furthermore have a stairway platform, which is arranged, in the direction of the vertical axis of the passenger cabin area, between first steps fastened to the first support-element portion and second steps fastened to the second support-element portion. The stairway platform allows a user of the stairway element, after climbing up the first steps and before climbing up the second steps, to turn comfortably.

In a preferred embodiment, the second support-element portion extends in the direction of the vertical axis of the passenger cabin area from a peripheral portion, facing an interior of the seating area, of the stairway platform. This allows optimal integration of the stairway element into the seating area. A passenger who would like to reach the sleeping berth assigned to the stairway element via the stairway element can then step in front of the first support-element portion from the aisle in the direction of the transverse axis of the passenger cabin area and climb up the first steps. On the stairway platform, the passenger can turn and finally comfortably climb up the second steps.

The first support-element portion is formed preferably by a rear wall of an ottoman arranged in the seating area. Additionally or alternatively, the stairway platform can be formed by a cover panel of an ottoman arranged in the seating area. As a result, the ottoman that is provided in the passenger cabin area anyway can be provided for an additional use without losing functionality as a footrest for a passenger who is sitting on a passenger seat assigned to the ottoman. As a result, the stairway element can be integrated into the seating area of the passenger cabin area in a particularly space-saving manner. As a result, it is also possible to equip a passenger cabin area in the form of a Business Class passenger cabin area with additional sleeping berths and stairway elements without it being necessary to dispense with passenger seats.

The stairway element may comprise a first privacy screen element, which extends next to the aisle. For example, the first privacy screen element may extend substantially perpendicularly to the transverse axis of the passenger cabin area. The first privacy screen element is arranged preferably at a distance from the second support-element portion and may extend preferably substantially parallel to the second support-element portion. The first privacy screen element screens a passenger who is climbing into the sleeping berth or leaving the sleeping berth via the second steps from the aisle.

Furthermore, the stairway element may comprise a second privacy screen element, which forms an angle of 70 to 110°, preferably an angle of 80 to 100°, and particularly preferably an angle of about 90°, with the second support-element portion. The second privacy screen element may extend in the direction of the vertical axis of the passenger cabin area from a peripheral portion, facing away from the first support-element portion, of the stairway platform. The second privacy screen element screens a passenger who is climbing into the sleeping berth or leaving the sleeping berth via the second steps in particular from a further passenger who is using the ottoman integrated into the stairway element as a footrest.

In particular, when the passenger cabin area is provided for use on board an aircraft, preferably at least one of the sleeping berths and/or at least one of the stairway elements is configured in the form of a "simple" aircraft monument certified for a load of 9 g. Preferably, all of the sleeping berths and stairway elements provided in the passenger cabin area are configured in the form of "simple" aircraft monuments certified for a load of 9 g. The sleeping berths and the stairway elements may then, just like other monuments, for example galleys or sanitary modules, be fastened at existing structural fastening points in the ceiling area and/or in the floor area of the passenger cabin. Furthermore, particularly easy integration of the sleeping berths and stairway elements into an already existing passenger cabin is then possible.

An aircraft is equipped with an above-described passenger cabin area.

BRIEF DESCRIPTION OF THE DRAWINGS

A preferred embodiment of the disclosure herein will now be explained in more detail with reference to the appended schematic drawings, in which.

DETAILED DESCRIPTION

Figure 1:
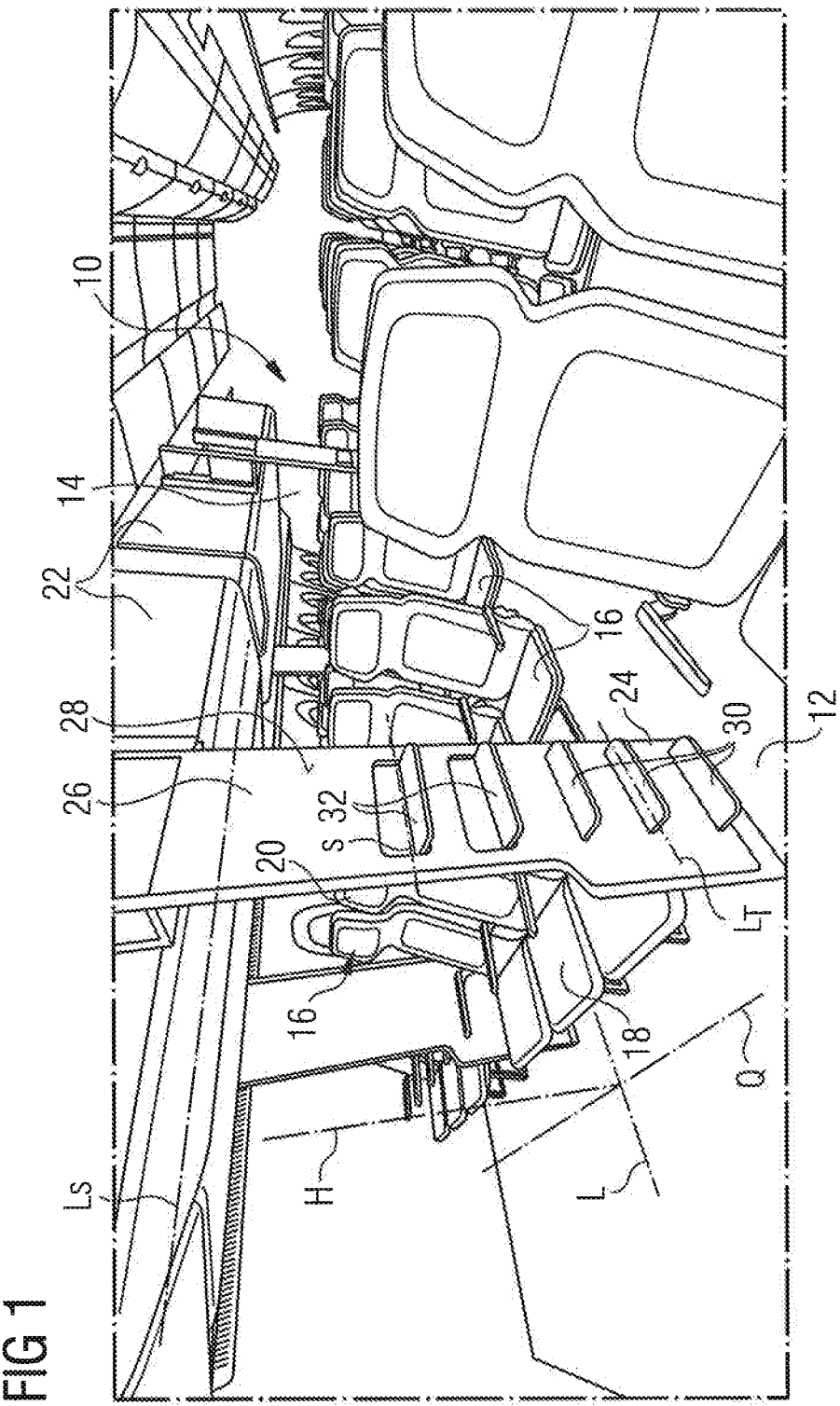
FIG. 1 shows a passenger cabin area configured in the form of an Economy Class passenger cabin area, wherein a stairway element provided in the passenger cabin area is in a ready-for-use state, in which all the steps of the stairway element extend substantially perpendicularly from a support face of a support element.
Figure 2:
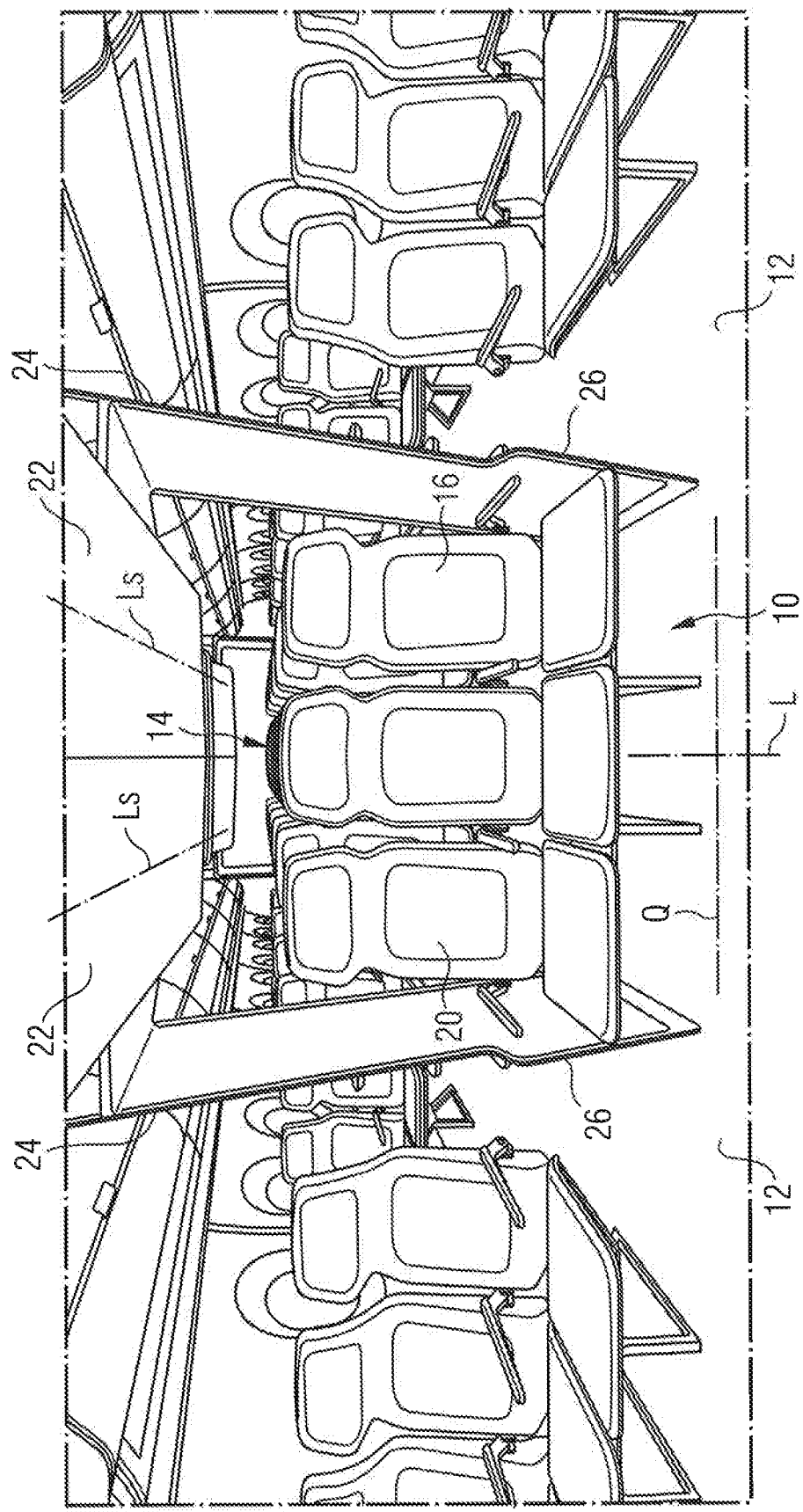
FIG. 2 shows the passenger cabin area according to FIG. 1 in a front view.
Figure 3:
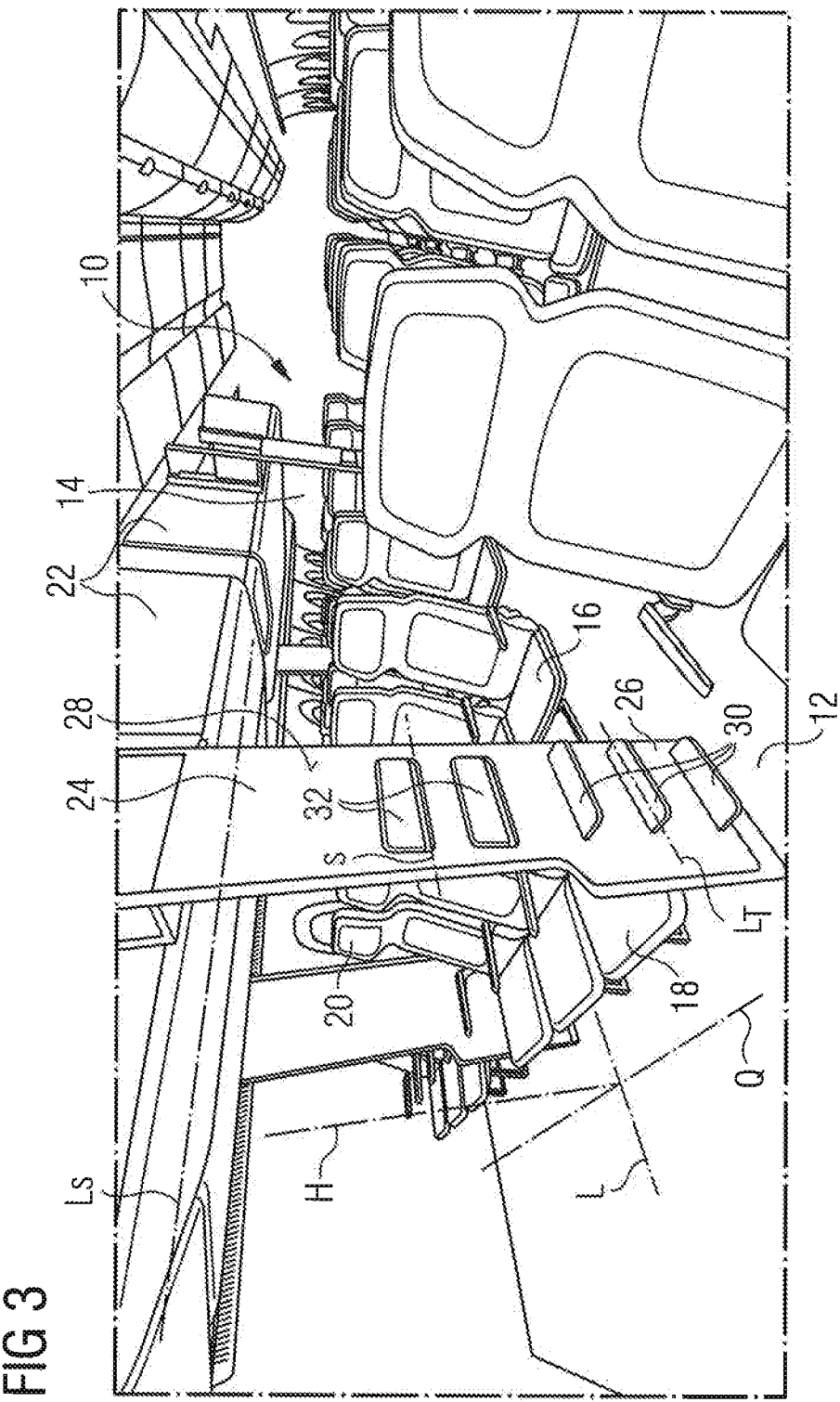
FIG. 3 shows the passenger cabin area according to FIG. 1, wherein the stairway element provided in the passenger cabin area is in a resting operating state, in which the two top-most steps of the stairway element extend substantially parallel to the support face of the support element.
Figure 4:
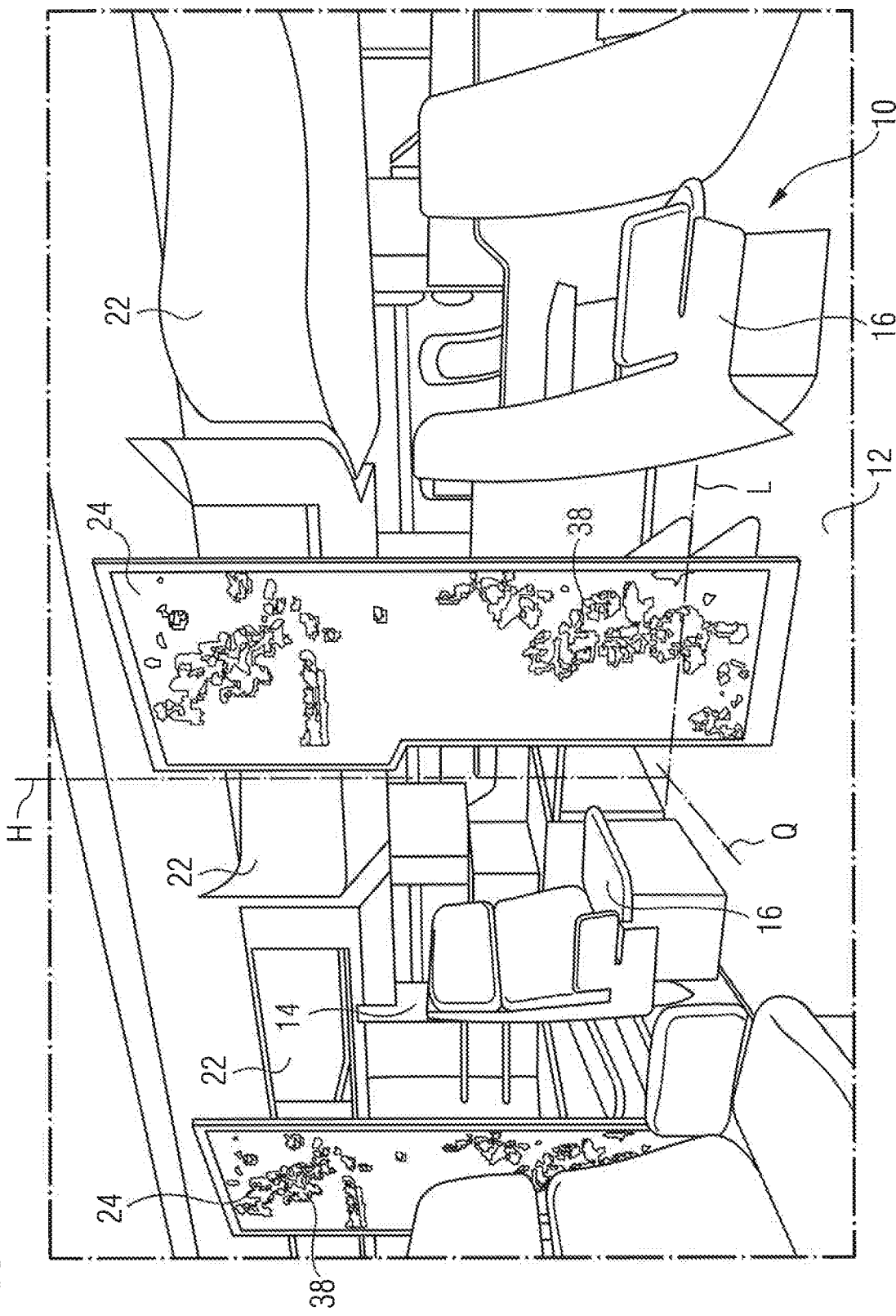
FIG. 4 shows an alternative passenger cabin area configured in the form of a Business Class/Premium Economy Class aircraft passenger cabin area.
Figure 5:
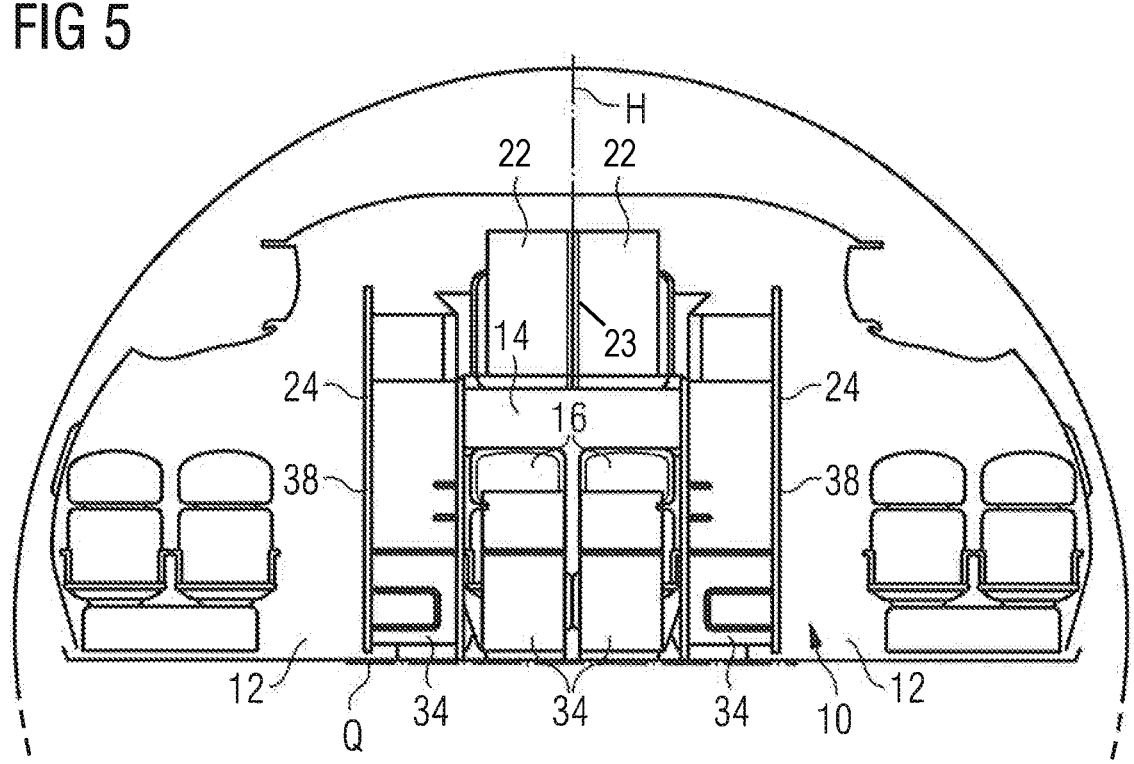
FIG. 5 shows the passenger cabin area according to FIG. 4 in a front view.
Figure 6:
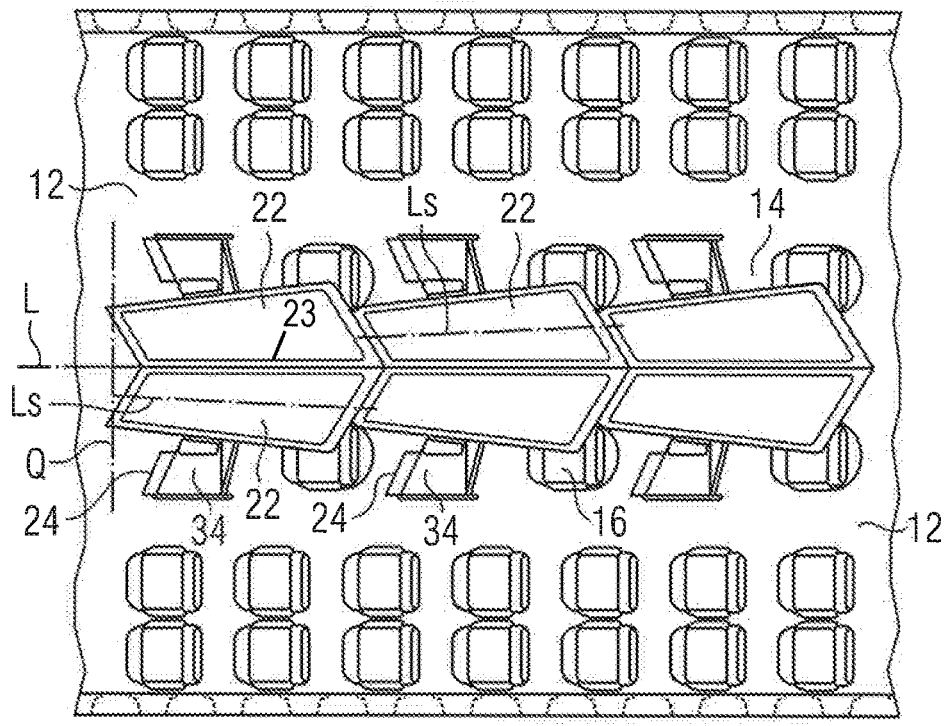
FIGS. 6 and 7 show the overall layout of the passenger cabin area according to FIG. 4.
Figure 7:
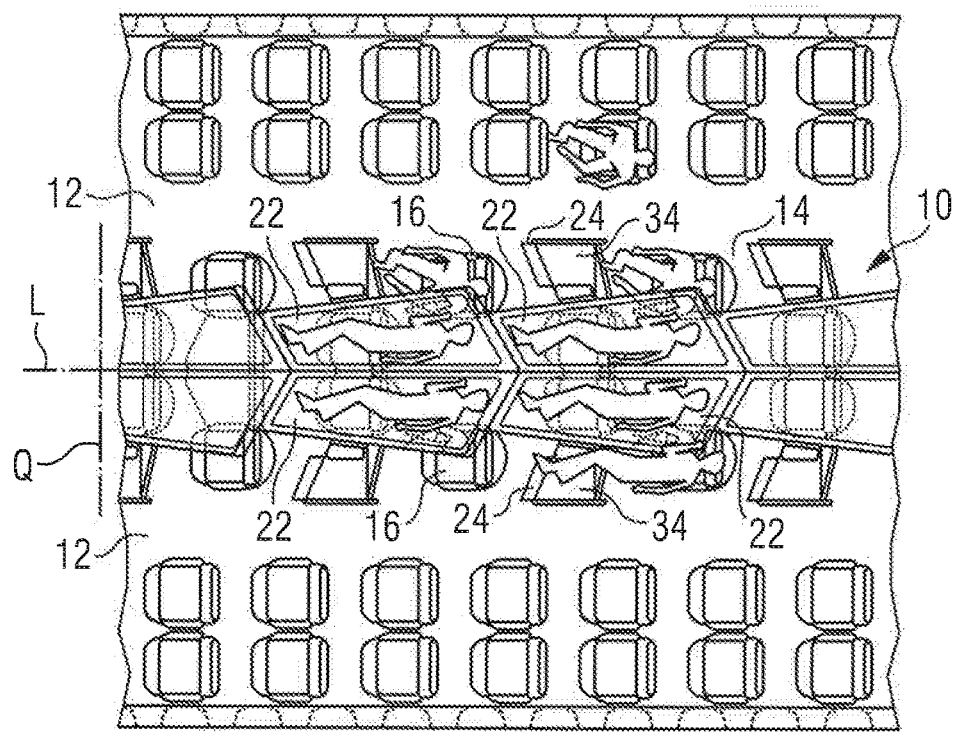

A passenger cabin area 10 shown in FIGS. 1 to 3 and configured in the form of an Economy Class aircraft passenger cabin area comprises at least one aisle 12 extending along a longitudinal axis L of the passenger cabin area 10. Furthermore, the passenger cabin area 10 comprises a seating area 14, which is arranged next to the aisle 12 in the direction of a transverse axis Q, perpendicular to the longitudinal axis L, of the passenger cabin area 10. In the passenger cabin area 10 illustrated in FIGS. 1 to 3, the seating area 14 is flanked on both sides by an aisle 12 that extends in each case along the longitudinal axis L of the passenger cabin area 10, i.e. the seating area 14 is a portion of an aircraft passenger cabin that is arranged centrally in the aircraft passenger cabin.

At least one passenger seat 16 is provided in the seating area 14. In particular, a plurality of passenger seats 16 are arranged in a plurality of rows positioned one after another in the seating area 14. The passenger seats 16 are configured as conventional Economy Class seats in the variant of the passenger cabin area 10 shown in FIGS. 1 to 3 and each comprise a sitting element 18 and a backrest element 20 that is pivotable relative to the sitting element 18 between an upright position and a slightly reclined position.

Furthermore, a plurality of sleeping berths 22 are installed in the passenger cabin area 10. The sleeping berths 22 are arranged above the seating area 14 in the direction of a vertical axis H, perpendicular to the longitudinal axis L and the transverse axis Q, of the passenger cabin area 10. In particular, the sleeping berths 22 are installed above the seating area 14 in the place of overhead compartments in the ceiling area of the passenger cabin area 10. Longitudinal axes $L_S$ of the sleeping berths 22 extend at an angle of about 8° to the longitudinal axis L of the passenger cabin area 10. In the direction of the transverse axis Q of the passenger cabin area 10, the sleeping berths 22 are arranged alongside one another in pairs; see in particular FIG. 3. Furthermore, a plurality of sleeping berths 22 are arranged one after another in the direction of the longitudinal axis L of the passenger cabin area 10.

Each sleeping berth 22 is accessible from one of the aisles 12 of the passenger cabin area 10 via a stairway element 24 assigned individually to the sleeping berth 22, i.e. the passenger cabin area 10 is equipped with an identical number of sleeping berths 22 and stairway elements 24, such that each sleeping berth 22 can be reached from one of the aisles 12 by way of its "own" stairway element 24 assigned to it. As a result, the sleeping berths 22 are accessible in an easy and convenient way for passengers traveling in the passenger cabin area 10. The sleeping berths 22 and the stairway elements 24 are each configured in the form of a "simple" aircraft monument certified for a load of 9 g. As a result, it is possible for the sleeping berths 22 and the stairway elements 24, just like other monuments, for example galleys or sanitary modules, to be fastened at existing structural fastening points in the ceiling area and/or in the floor area of the aircraft passenger cabin.

The number of sleeping berths 22 in the passenger cabin area 10 is lower than the number of passenger seats 16 provided in the seating area 14 of the passenger cabin area 10. Therefore, although not every passenger traveling in the passenger cabin area 10 will have their own sleeping berth 22 available to them, passengers who would like to use a sleeping berth 22 have the possibility of booking it in addition to their seat. Furthermore, the passengers traveling in the passenger cabin area 10 can be provided with the option of booking a sleeping berth 22 for only a part of the travel time, such that it is also possible for several passengers to share a sleeping berth 22.

Each of the stairway elements 24 comprises a support element 26 extending in the direction of the vertical axis H of the passenger cabin area 10. The support element 26 is formed in a substantially panel-like manner and has a substantially flat support face 28. The support face 28 of each support element 26 extends substantially perpendicularly to the transverse axis Q of the passenger cabin area 10. Furthermore, the stairway elements 24 each comprise a plurality of first and second steps 30, 32, which are fastened to the support element 26 and extend, at least in a ready-for-use operating state of the support element 26, substantially perpendicularly from the support face 28 of the support element 26.

Each support element 26 is positioned next to a passenger seat 16, arranged in the seating area 14, in the direction of the transverse axis Q of the passenger cabin area 10, such that the support element 26 extends along a "boundary" between the seating area 14 and the aisle 12, wherein the support face 28, bearing the steps 30, 32, of the support element 26 faces the aisle 12 and immediately adjoins the aisle 12. Furthermore, the support element 26 has, in the direction of the longitudinal axis L of the passenger cabin area 10, a dimension that is not substantially greater than a dimension of the passenger seat 16, arranged next to the support element 26 in the direction of the transverse axis Q of the passenger cabin area 10, in the direction of the longitudinal axis L of the passenger cabin area 10. This ensures that the support element 26 does not impede access to the passenger seat 16 positioned next to the support element 26.

In the passenger cabin area 10 illustrated in FIGS. 1 to 3, every third middle seat row is flanked on both sides by a support element 26. In other words, considered in the direction of the longitudinal axis L of the passenger cabin area 10, a support element 26 of a stairway element 24 is arranged next to every third aisle passenger seat in order to allow access to a sleeping berth 22 arranged above the seating area 14.

In the passenger cabin area 10 configured as a portion of an aircraft passenger cabin, the aisle 12 has to be less wide in an area close to the floor than in an area located for example at shoulder height of a passenger standing in the aisle 12. The three bottom-most first steps 30 of the stairway element 24 are therefore embodied as plate-like steps connected rigidly to the support element 26. In contrast thereto, the two top-most second steps 32 are fastened to the support element 26 so as to be movable between a resting operating state and a use operating state. In particular, the two second steps 32 are pivotable between their resting operating state and their use operating state about a pivot axis S that extends, in a peripheral portion, facing the support face 28 of the support element 26, of the two second steps 32, substantially parallel to a longitudinal axis LT of the steps 32.

In their use operating state illustrated in FIGS. 1 and 2, the two second steps 32 fastened in a movable manner to the support element 26 extend parallel to the three first steps 30 substantially perpendicularly to the support face 28 of the support element 26. In their resting operating state shown in FIG. 3, the two second steps 32 fastened in a movable manner to the support element 26 extend, by contrast, substantially parallel to the support face 28 of the support element 26. When the sleeping berth 22 assigned to a stairway element 24 is not in use, for example during the start and/or landing of an aircraft equipped with the passenger cabin area 10, the two second steps 32 configured in a movable manner can be pivoted into their resting operating state and as a result the width of the aisle 12 adjoining the support element 26 can be increased in the region of the steps 32.

In the embodiment shown in FIGS. 1 to 3 of a passenger cabin area 10, the stairway element 24 is furthermore equipped with first and second steps 30, 32, which, in a ready-for-use operating state of the stairway element 24, i.e. in a state in which the two pivotable steps 32 are also in their use operating state, have different depths in the direction perpendicular to the support face 28 of the support element 26. In particular, the two second steps 32 fastened to the support element 26 have a smaller depth than the three first steps 30 fastened to the support element 26 farther down in an area of the support element 26 close to the floor. This configuration of the stairway element 24 allows, in the region of the second steps 32, a greater width of the aisle 12 adjoining the support element 26 even when the second steps 32 are in their use operating state.

Figure 12:
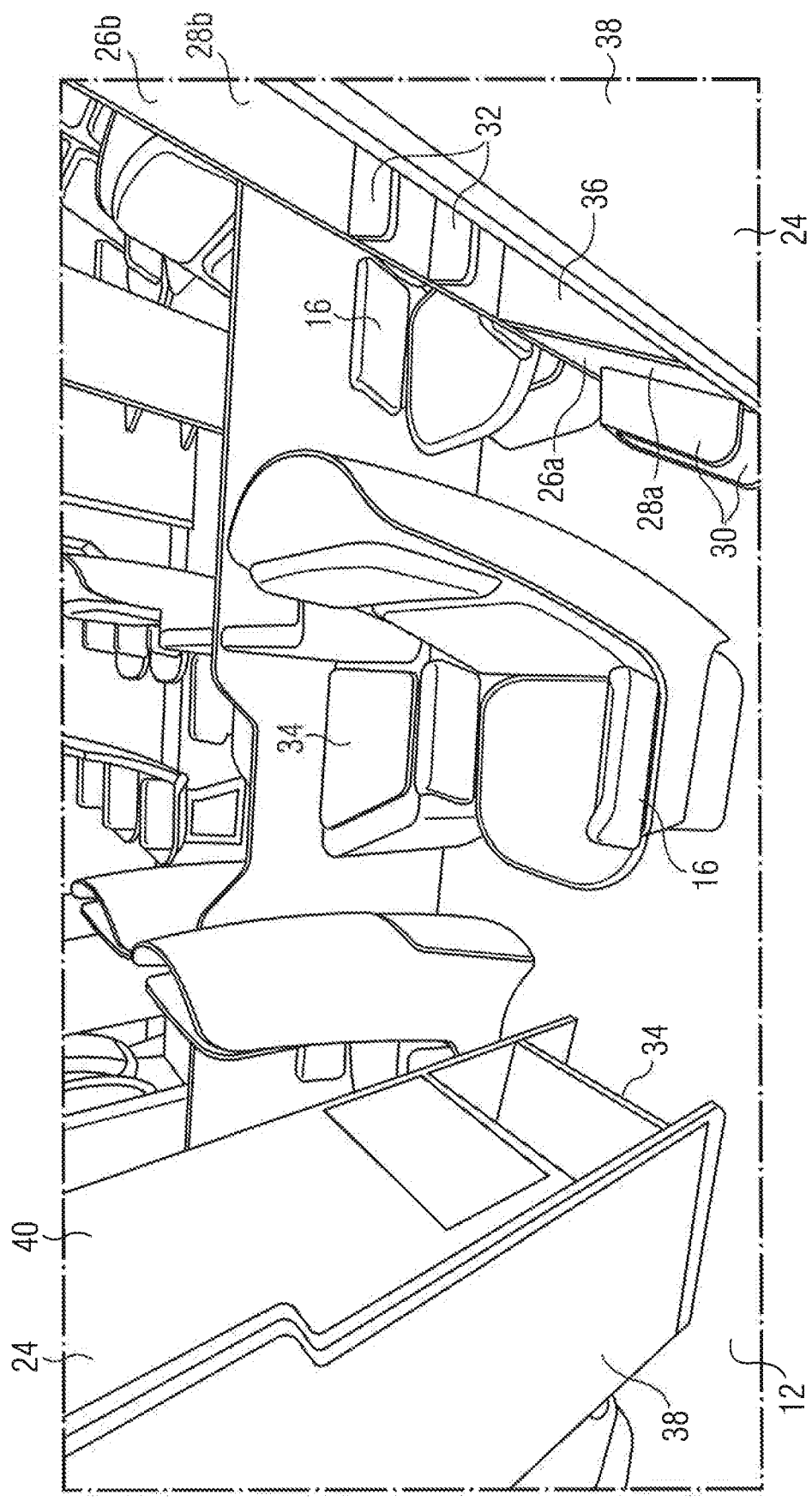
FIGS. 12 through 14 show further detail illustrations of the passenger cabin area according to FIG. 4, from which in particular the structure and the use of ottomans provided in the passenger cabin area are apparent.
Figure 13:
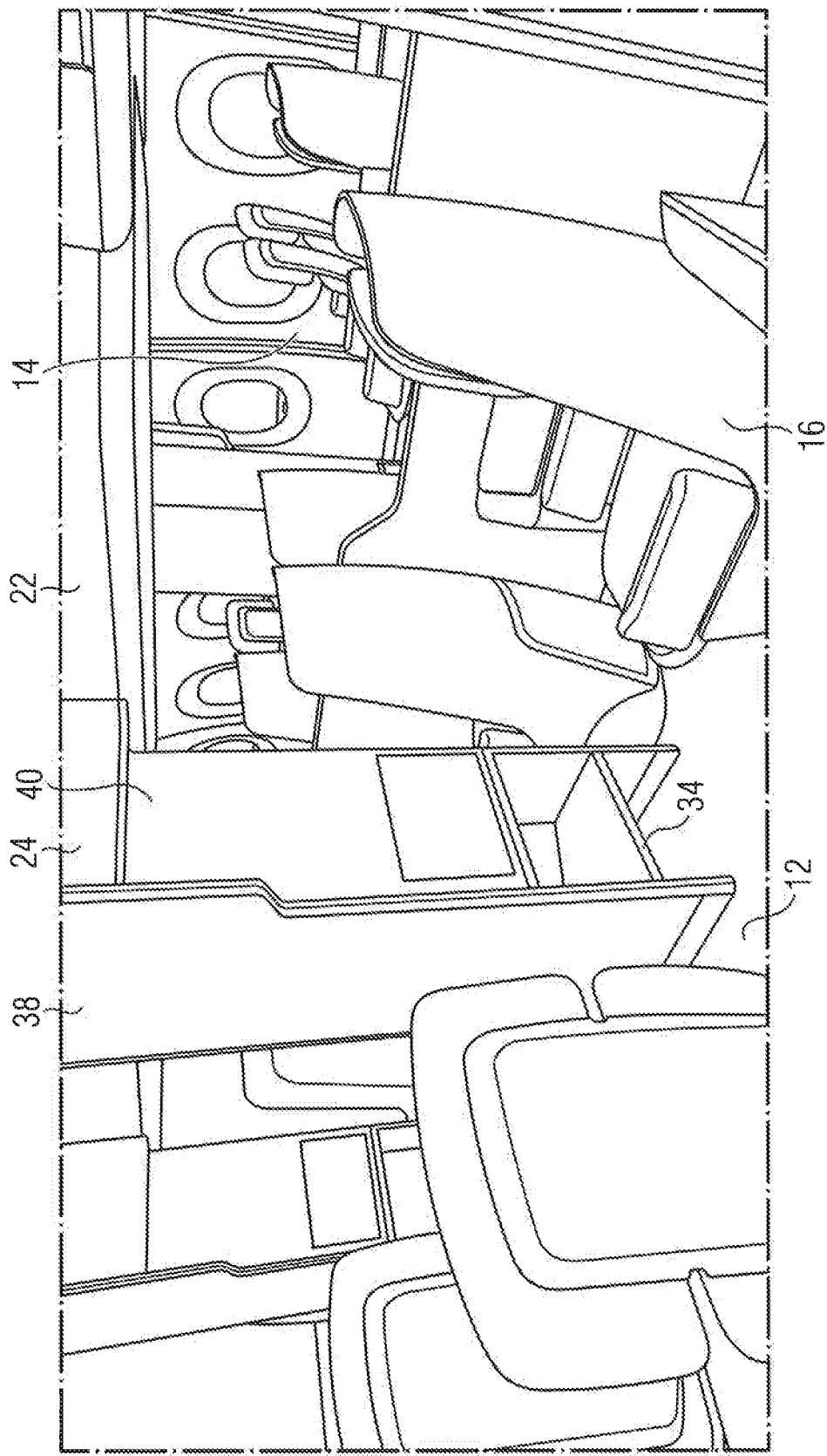
Figure 14:
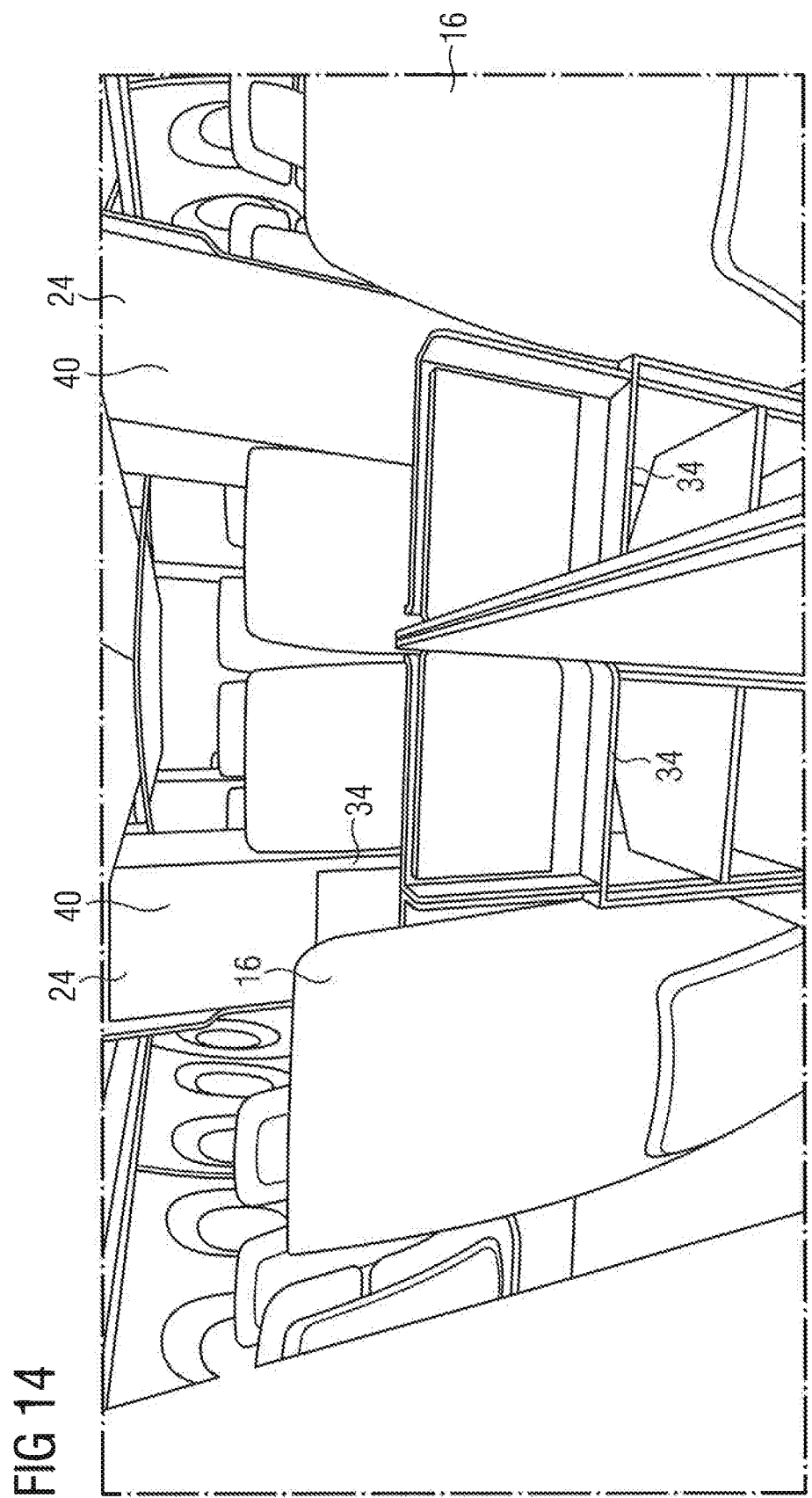
Figure 15:
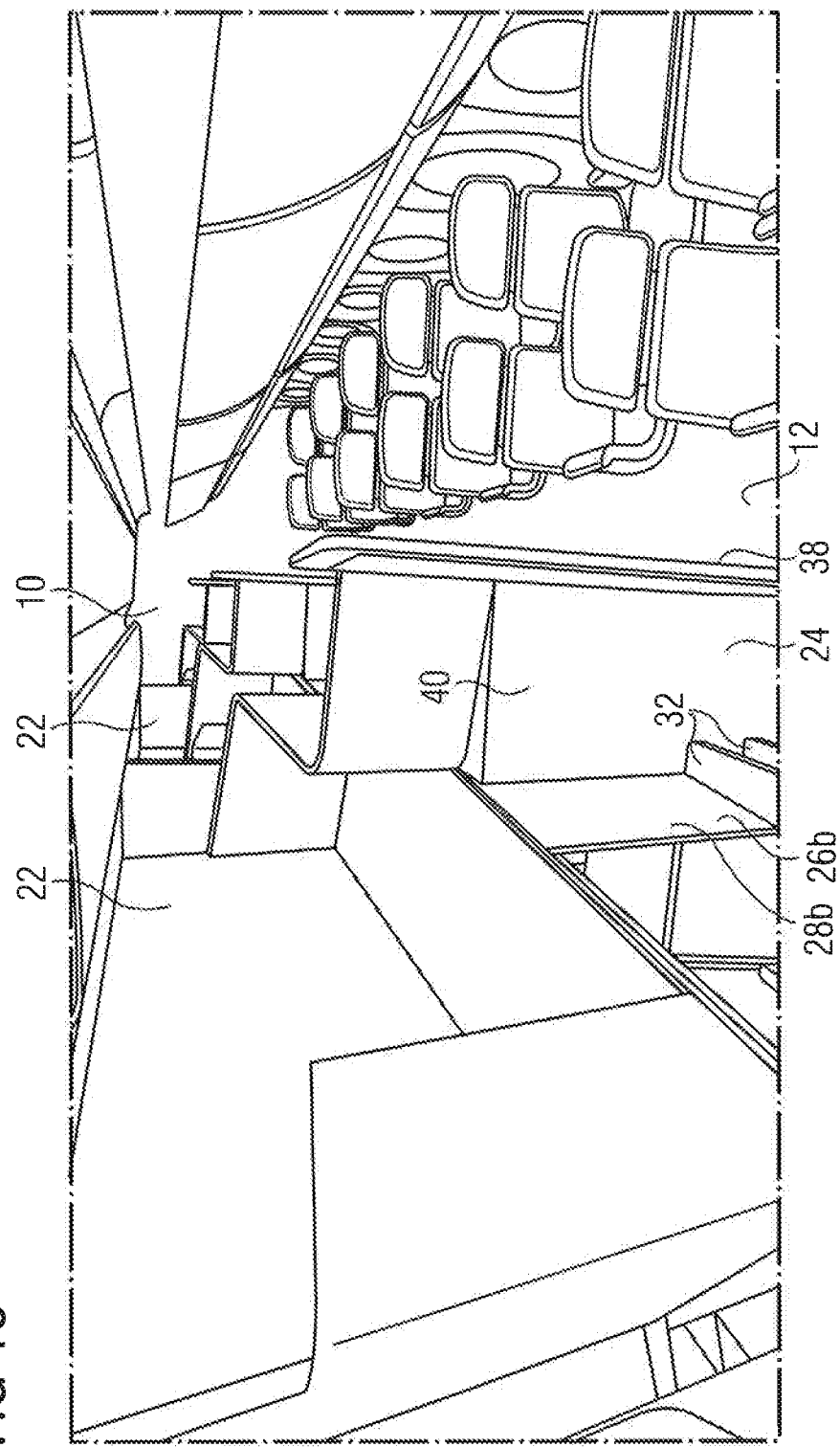
FIGS. 15 through 16 show further detail illustrations of the passenger cabin area according to FIG. 4, from which in particular the structure of sleeping berths provided in the passenger cabin area is apparent.
Figure 16:
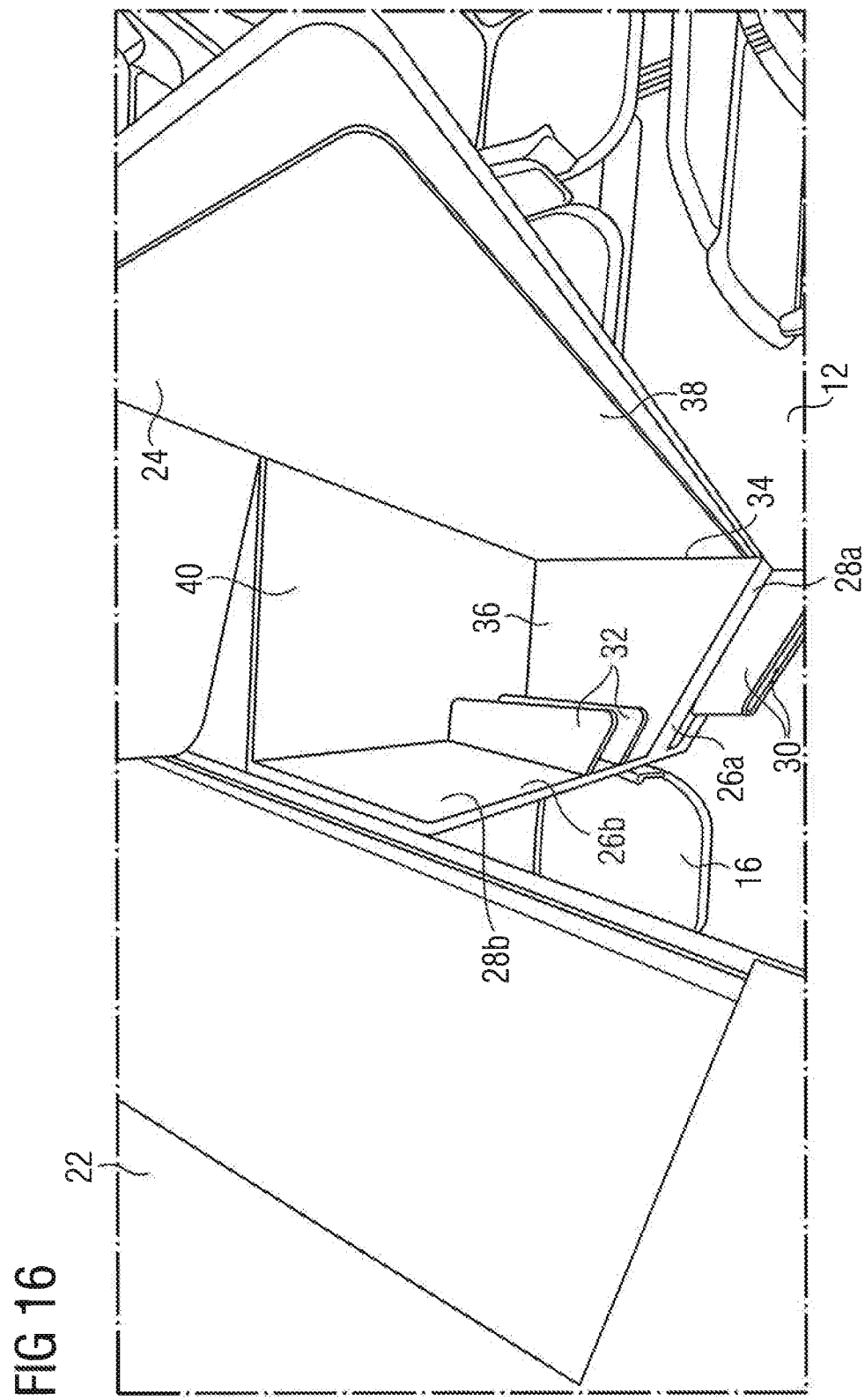

An alternative embodiment of the passenger cabin area 10 is illustrated in FIGS. 4 to 16. The passenger cabin area 10 shown in FIGS. 4 to 16 is also arranged centrally in an aircraft passenger cabin and is flanked on both sides by an aisle 12 extending in each case along the longitudinal axis L of the passenger cabin area 10. The passenger seats 16 arranged in the seating area 14 of the passenger cabin area 10 are embodied as Business Class seats, however, which are adjustable between an upright position and a sleeping position, in particular a flat bed position. Furthermore, each passenger seat 16 is assigned an ottoman 34 that serves as a footrest for a passenger sitting or lying on the passenger seat 16 (see in particular FIGS. 12 to 14).

The passenger seats 16 provided in the seating area 14 are each arranged in rows of two in a manner offset relative to one another such that a row with two passenger seats 16 arranged on the "outside", i.e. adjacent to the aisles 12, is followed in each case by a row with passenger seats 16 arranged on the "inside", i.e. at a distance from the aisles 12. Arranged in each case between two passenger seats 16 arranged on the "outside" are two ottomans 34, which are assigned to the passenger seats 16, arranged on the "inside", of the following row. Accordingly, on the "aisle side" of each passenger seat 16 arranged on the "inside", an ottoman 34 is positioned, which is assigned to a passenger seat 16, arranged on the "outside", of the following row (see in particular FIGS. 6 to 8).

Furthermore, in the passenger cabin area 10 according to FIGS. 4 to 16, as in the passenger cabin area 10 shown in FIGS. 1 to 3, a plurality of sleeping berths 22 are installed above the seating area 14 in the place of overhead compartments in the ceiling area of the passenger cabin area 10. Again, the sleeping berths 22 are arranged alongside one another in pairs in the direction of the transverse axis Q of the passenger cabin area 10, each sleeping berth 22 in a pair of sleeping berths 22 being separated from the other sleeping berth 22 in the same pair of sleeping berths 22 by a physical barrier 23, as shown at least in FIGS. 5 and 6. Furthermore, a plurality of sleeping berths 22 are arranged one after another in the direction of the longitudinal axis L of the passenger cabin area 10. Longitudinal axes LS of the sleeping berths 22 extend at an angle of about 8° to the longitudinal axis L of the passenger cabin area 10 (see, in particular, FIGS. 4 to 7, 15, and 16).

The stairway elements 24 assigned individually to the sleeping berths 22 are, however, no longer provided with a panel-like support element 26 of simple construction with first and second steps 30, 32 attached thereto. Rather, the support element 26 of each stairway element 24 has a first support-element portion 26a with a first support-element face 28a and a second support-element portion 26b with a second support-element face 28b. Two first steps 30 are fastened rigidly to the first support-element portion 26a and extend substantially perpendicularly to the first support-element face 28a. Two second steps 32, which extend substantially perpendicularly to the second support-element face 28b, are fastened rigidly to the second support-element portion 26b.

Figure 9:
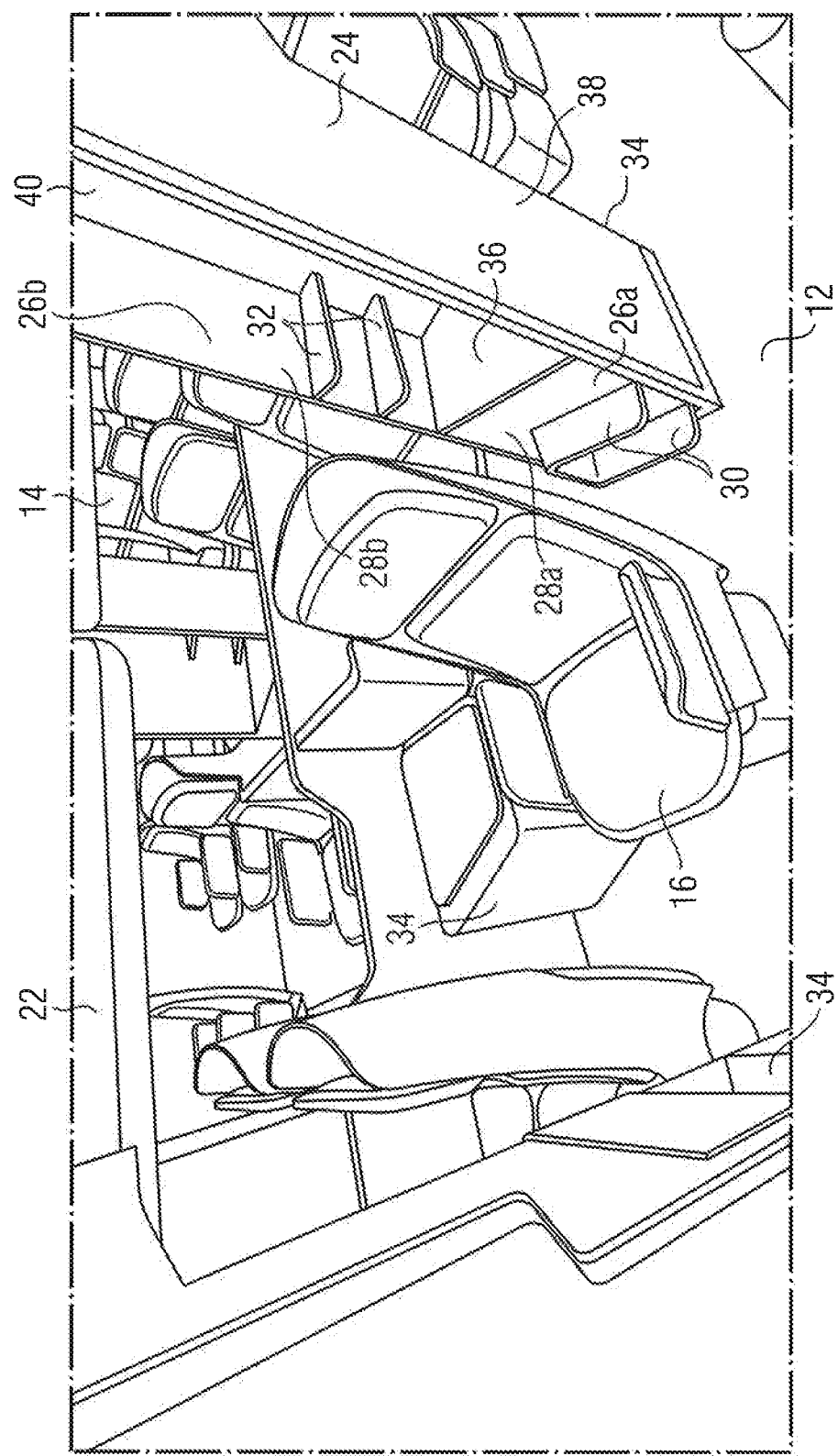
FIGS. 9 through 11 show detail illustrations of the passenger cabin area according to FIG. 4, from which in particular the structure of stairway elements provided in the passenger cabin area is apparent.
Figure 10:
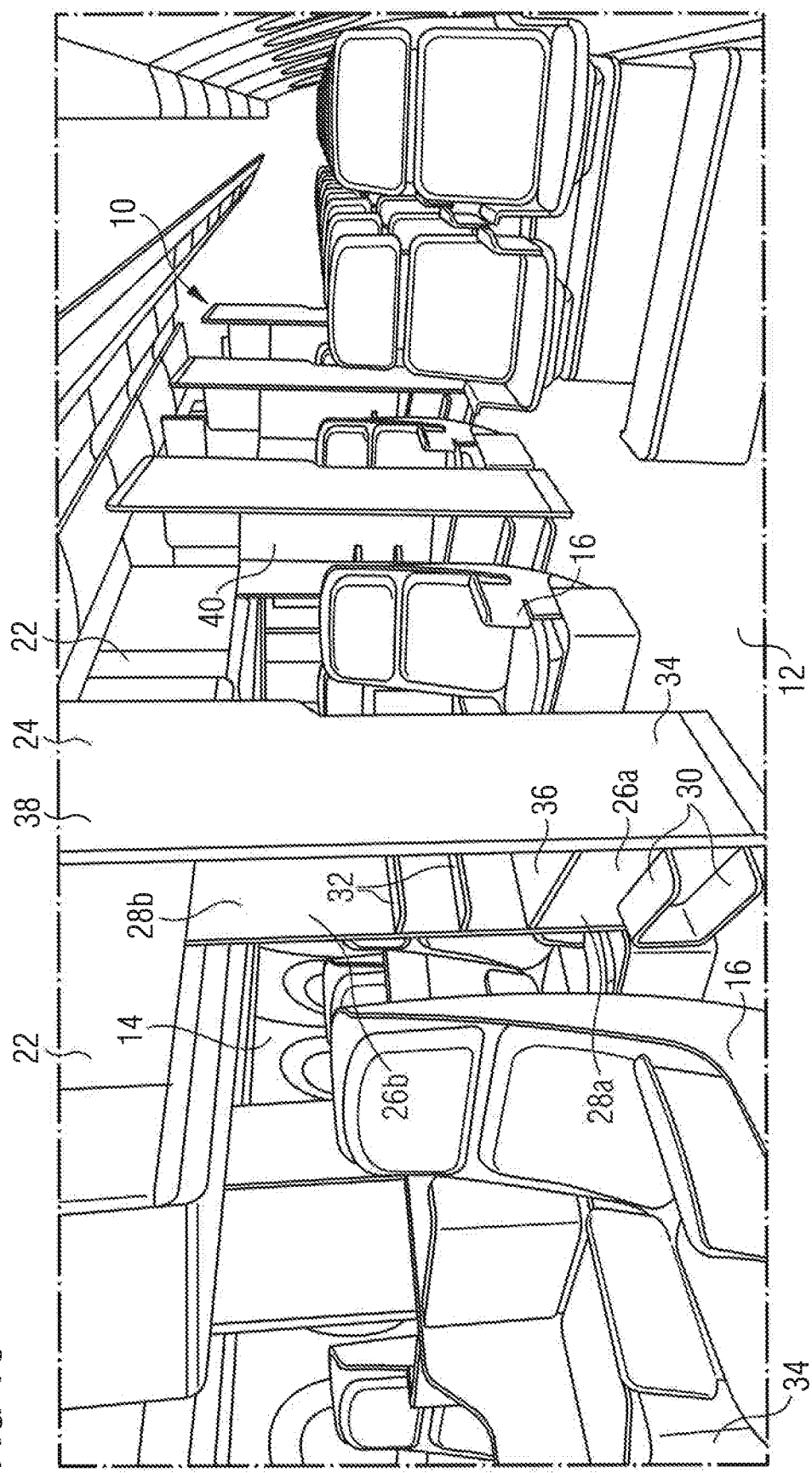
Figure 11:
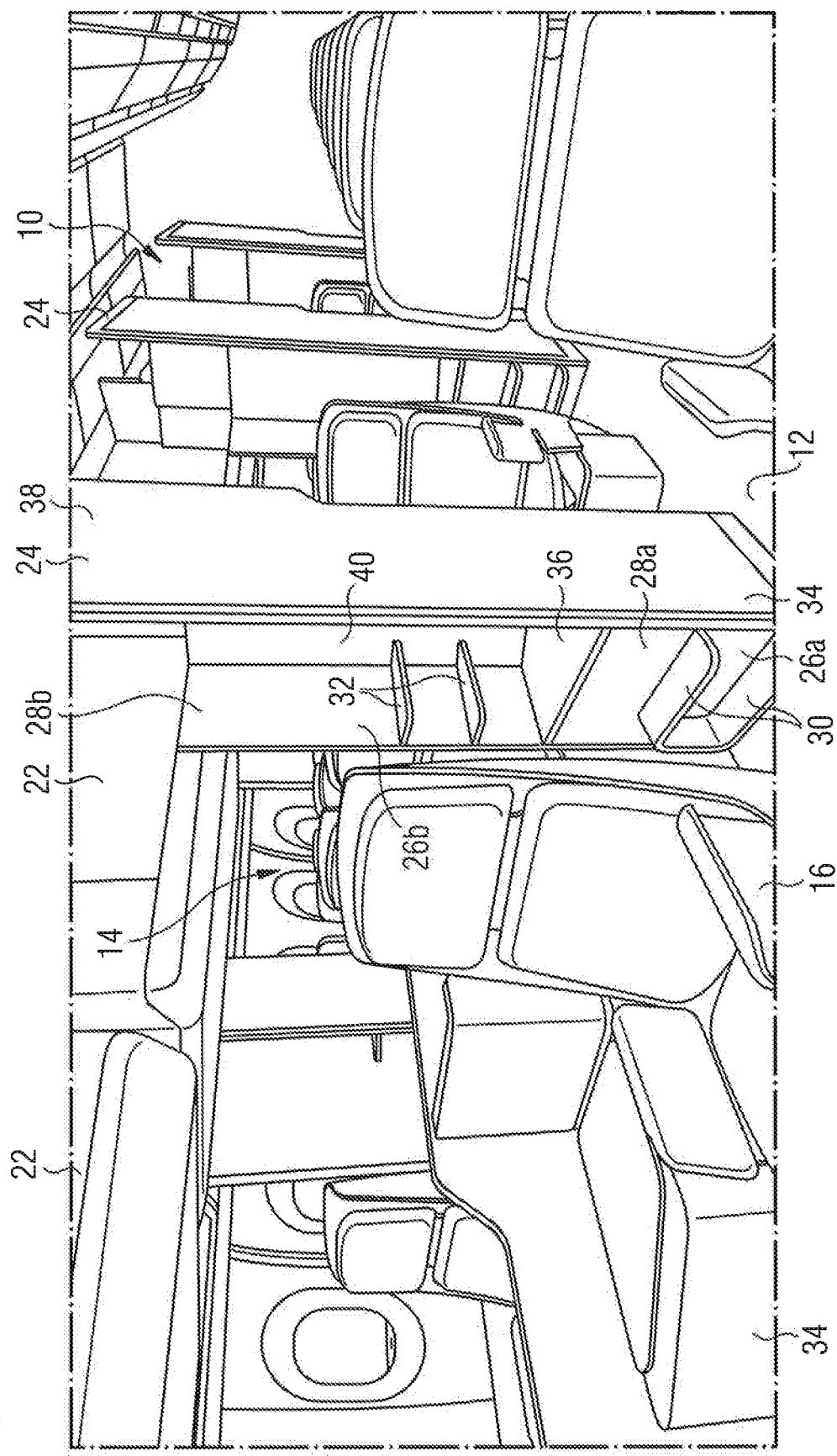

As is apparent in particular in FIGS. 9 to 11, the first support-element face 28a forms an angle of less than 15° and in particular an angle of about 10° with the transverse axis Q of the passenger cabin area 10, i.e. the first support-element face 28a extends from one of the aisles 12 in the direction of an interior of the seating area 14. Accordingly, the longitudinal axes LT of the first steps 30 fastened to the first support-element portion 26a likewise extend at an angle of less than 15° and in particular at an angle of about 10° to the transverse axis Q of the passenger cabin area 10.

By contrast, the second support-element face 28b extends substantially parallel to the longitudinal axis L and consequently substantially perpendicularly to the transverse axis Q of the passenger cabin area 10. Furthermore, the second support-element portion 26b and consequently the second support-element face 28b are arranged in the interior of the seating area 14 in a manner offset in the direction of the transverse axis Q of the passenger cabin area 10 with respect to the aisle 12. The longitudinal axes LT of the second steps 32 fastened to the second support-element portion 26b extend substantially parallel to the longitudinal axis L of the passenger cabin area 10.

In the example embodiment illustrated in FIGS. 4 to 16 of a passenger cabin area 10, the first support-element face 28a of the first support-element portion 26a forms an angle of about 100° with the second support-element face 28b of the second support-element portion 26b. As a result, the stairway element 24 forms a kind of "spiral stairway", which is both space-saving and also convenient to use.

In order to allow convenient use of the stairway element 24 configured in the form of a "spiral stairway" and in particular to make it easier for a passenger using the stairway element 24 to turn, this being necessary in order to climb from the upper second steps 32 onto the lower first steps 30, or vice versa, the stairway element 24 furthermore has a stairway platform 36, which is arranged, in the direction of the vertical axis H of the passenger cabin area 10, between the first steps 30 fastened to the first support-element portion 26a and the second steps 32 fastened to the second support-element portion 26b. The second support-element portion 26b of the support element 26 extends in the direction of the vertical axis H of the passenger cabin area 10 from a peripheral portion, facing the interior of the seating area 14, of the stairway platform 36.

As is most clearly apparent from FIGS. 9 to 14, the first support-element portion 26a of each stairway element 24 is formed by a rear wall of an ottoman 34 arranged in the seating area 14. Furthermore, the stairway platform 36 of each stairway element 24 is formed by a cover panel of the ottoman 34 arranged in the seating area 14. As a result, the ottomans 34 can fulfil the dual function of serving as a footrest for a passenger who is sitting on a passenger seat 16 assigned to the ottoman 34 and of forming an integral constituent of the stairway element 24. As a result, the stairway element 24 can be integrated into the seating area 14 of the passenger cabin area 10 in a particularly space-saving manner.

In the layouts shown in the figures of the passenger cabin area 10, only ottomans 34 that are arranged on the "outside", i.e. adjacent to the aisle 12, and are assigned to passenger seats 16 arranged on the "outside", i.e. adjacent to the aisle 12, are integrated into the stairway elements 24. By contrast, ottomans 34 that are positioned on the "inside" in the seating area 14 and are likewise assigned to passenger seats 16 positioned on the "inside" in the seating area 14 are provided only for use in a conventional manner as footrests.

Each stairway element 44 furthermore comprises a first privacy screen element 38, which extends next to the aisle 12. In particular, the first privacy screen element 38 extends substantially perpendicularly to the transverse axis Q of the passenger cabin area 10 at a distance from, and in this case also substantially parallel to, the second support-element portion 28a. The first privacy screen element 38 serves to screen a passenger who is climbing into the sleeping berth 22 or leaving the sleeping berth 22 via the second steps 32 from the aisle 12. Furthermore, the stairway element 24 comprises a second privacy screen element 40, which extends substantially perpendicularly to the second support-element portion 26b from a peripheral portion, facing away from the first support-element portion 26a, of the stairway platform 36 in the direction of the vertical axis H of the passenger cabin area 10. The second privacy screen element 40 serves to screen a passenger who is climbing into the sleeping berth 22 or leaving the sleeping berth 22 via the second steps 32, in particular from a further passenger who is using the ottoman 34 integrated into the stairway element 24 as a footrest.

Figure 8:
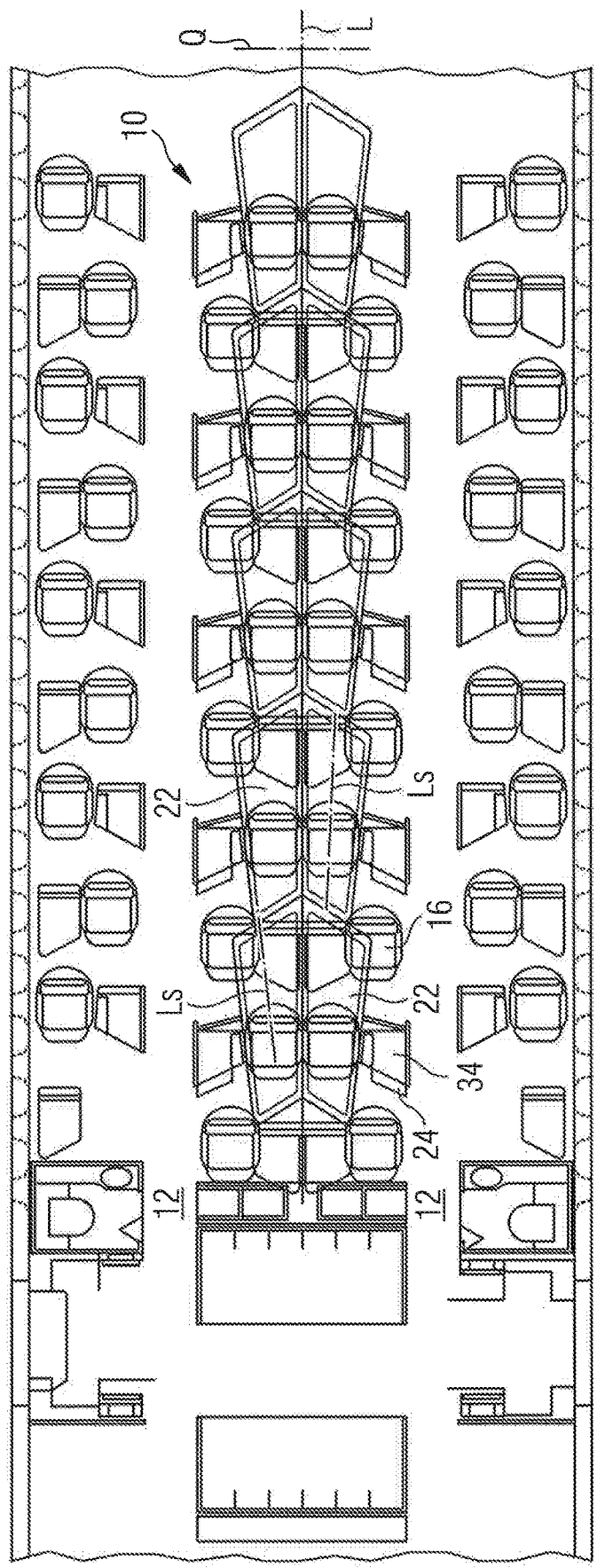
FIG. 8 shows an alternative overall layout of the passenger cabin area according to FIG. 4.

The passenger cabin area 10 equipped with Business Class passenger seats 16 can, as shown in FIGS. 4 to 7 and 9 to 16, be integrated into a Business Class/Premium Economy Class area of an aircraft passenger cabin, in which the external passenger seat rows are equipped only with Premium Economy Class passenger seats. In particular, the passengers sitting on these passenger seats then have the possibility of booking a sleeping berth 22 for the entire journey or only part thereof, in order to increase their travel comfort. Alternatively, however, it is also conceivable to integrate the passenger cabin area 10, as illustrated in FIG. 8, into a region of an aircraft passenger cabin that is equipped entirely with Business Class passenger seats 16.

Figure 17:
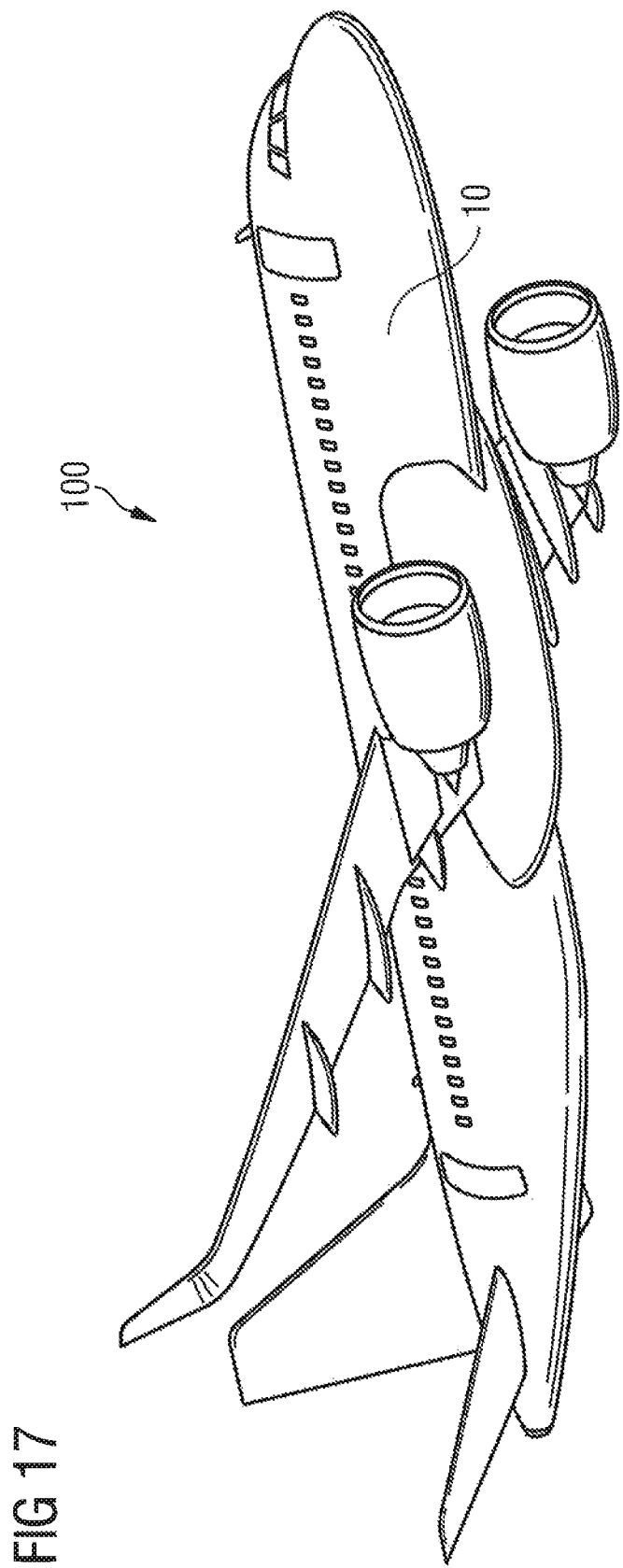
FIG. 17 shows an aircraft equipped with a passenger cabin area according to FIGS. 1 through 3 and/or FIGS. 4 through 16.

An aircraft 100 equipped with a passenger cabin area according to FIGS. 1 to 3 and/or FIGS. 4 to 16 is shown in FIG. 17.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger cabin area comprising:
   at least one aisle extending along a longitudinal axis of the passenger cabin area;
   a seating area arranged next to the aisle in a direction of a transverse axis of the passenger cabin area, the transverse axis being perpendicular to the longitudinal axis, wherein the seating area comprises one or more passenger seats, all of the one or more passenger seats in the seating area being on a same side of the aisle as each other;
   a plurality of sleeping berths arranged above the seating area in a direction of a vertical axis of the passenger cabin area, the vertical axis being perpendicular to the longitudinal axis and the transverse axis; and
   stairway elements, each of the stairway elements being assigned individually to a corresponding sleeping berth of the plurality of sleeping berths and configured to provide access from the aisle of the passenger cabin area to the corresponding sleeping berth associated therewith, the stairway elements comprising:
      a support element that extends in the direction of the vertical axis and comprises a substantially flat support face; and
      a plurality of steps that are fastened to a portion of the substantially flat support face and extend, in a ready-for-use operating state of the stairway element, substantially perpendicularly from the substantially flat support face of the support element;
   wherein the support element is positioned laterally adjacent, in the direction of the transverse axis, to a passenger seat of the one or more passenger seats, such that the support element is within the seating area and between the passenger seat and the aisle; and
   wherein the portion of the substantially flat support face to which the plurality of steps are attached faces the aisle.

2. The passenger cabin area of claim 1, wherein at least one step of the plurality of steps is fastened to the portion of the substantially flat support face in a pivotably movable manner, such that the at least one step is moveable between a resting operating state, in which the at least one step extends substantially parallel to the substantially flat support face of the support element, and a use operating state, in which the at least one step extends substantially perpendicularly from the substantially flat support face of the support element.

3. The passenger cabin area of claim 2, wherein at least one step of the plurality of steps have a different depth from at least one other step of the plurality of steps, the depth being in a direction perpendicular to the substantially flat support face of the support element, at least when the at least one step and the at least one other step are in the use operating state.

4. The passenger cabin area of claim 1, wherein the support element is formed in a substantially panel-like manner.

5. The passenger cabin area of claim 1, wherein at least one of the sleeping berths and/or at least one of the stairway elements is configured in a form of an aircraft monument certified for a load of 9 g.

6. An aircraft equipped with a passenger cabin area of claim 1.

7. A passenger cabin area comprising:
   at least one aisle extending along a longitudinal axis of the passenger cabin area;
   a seating area arranged next to the aisle in a direction of a transverse axis of the passenger cabin area, the transverse axis being perpendicular to the longitudinal axis, wherein the seating area comprises one or more passenger seats, all of the one or more passenger seats in the seating area being on a same side of the aisle as each other;
   a plurality of sleeping berths arranged above the seating area in a direction of a vertical axis of the passenger cabin area, the vertical axis being perpendicular to the longitudinal axis and the transverse axis, wherein adjacent sleeping berths of the plurality of sleeping berths that are laterally adjacent to each other in the direction of the transverse axis are separated from each other by a physical barrier; and
   stairway elements, each of which is assigned individually to a corresponding sleeping berth of the plurality of sleeping berths, each of the stairway elements being configured to provide access from the aisle of the passenger cabin area to the corresponding sleeping berth associated therewith, wherein at least one of the stairway elements comprises:
      a support element extending in the direction of the vertical axis, wherein the support element is formed in a substantially panel-like manner and has a support face that is substantially flat, the support element being arranged such that the support face thereof is substantially parallel to the longitudinal axis of the passenger cabin area; and
      a plurality of steps fastened to the support element, wherein, when the plurality of steps are in a ready-for-use operating state, the plurality of steps extend substantially perpendicularly away, in a plane defined by the longitudinal axis of the passenger cabin area and the transverse axis of the passenger cabin area, from the support face of the support element;
   wherein the support element is positioned laterally adjacent, in the direction of the transverse axis, to a passenger seat of the one or more passenger seats, such that the support element is within the seating area and between the passenger seat and the aisle;
wherein each sleeping berth of the plurality of sleeping berths is only accessible by a single one of the stairway elements.

8. The passenger cabin area of claim 7, wherein at least one of the sleeping berths and/or at least one of the stairway elements is configured in a form of an aircraft monument certified for a load of 9 g.

9. An aircraft equipped with a passenger cabin area of claim 7.

10. A passenger cabin area comprising:
at least one aisle extending along a longitudinal axis of the passenger cabin area;
a seating area arranged next to the aisle in a direction of a transverse axis of the passenger cabin area, the transverse axis being perpendicular to the longitudinal axis, wherein the seating area comprises one or more passenger seats, all of the one or more passenger seats in the seating area being on a same side of the aisle as each other;
a plurality of sleeping berths arranged above the seating area in a direction of a vertical axis of the passenger cabin area, the vertical axis being perpendicular to the longitudinal axis and the transverse axis; and
stairway elements, each of the stairway elements being assigned individually to a corresponding sleeping berth of the plurality of sleeping berths and configured to provide access from the aisle of the passenger cabin area to the corresponding sleeping berth associated therewith, the stairway elements comprising:
a support element comprising:
a first support-element portion, which has a substantially flat first support-element face, the first support-element face extending in the direction of the vertical axis and forming an angle of less than 45° with the transverse axis; and
a second support-element portion, which has a substantially flat second support-element face, the second support-element face extending in the direction of the vertical axis and forming an angle of less than 45° with the longitudinal axis of the passenger cabin area;
a plurality of first steps that are fastened to a portion of the substantially flat first support-element face and extend, at least in a ready-for-use operating state of the stairway element, substantially perpendicularly from the substantially flat first support-element face; and
a plurality of second steps that are fastened to a portion of the substantially flat second support-element face and extend, at least in a ready-for-use operating state of the stairway element, substantially perpendicularly from the substantially flat second support-element face;
wherein the second support-element portion is positioned laterally adjacent, in the direction of the transverse axis, to one of the one or more passenger seats.

11. The passenger cabin area of claim 10, wherein the first support-element face of the first support-element portion forms an angle of 70° to 110° with the second support-element face of the second support-element portion.

12. The passenger cabin area of claim 10, wherein the stairway elements comprise a stairway platform, which is arranged, in the direction of the vertical axis, between first steps fastened to the first support-element portion and second steps fastened to the second support-element portion.

13. The passenger cabin area of claim 12, wherein the second support-element portion extends in the direction of the vertical axis from a peripheral portion, facing an interior of the seating area, of the stairway platform.

14. The passenger cabin area of claim 12, wherein:
the first support-element portion, the second support-element portion, and the stairway platform define a region in which an ottoman is formed in the seating area;
a rear wall of the ottoman is formed by the first support-element portion;
a cover panel of the ottoman is formed by the stairway platform; and
an inner lateral wall of the ottoman is formed by a portion of the second support-element portion.

15. The passenger cabin area of claim 10, wherein the stairway elements comprise a first privacy screen element, which extends next to the aisle and is substantially parallel to the second support-element portion.

16. The passenger cabin area of claim 15, wherein the stairway elements comprise a second privacy screen element, which forms an angle of 70° to 110° with the second support-element portion.

17. The passenger cabin area of claim 10, comprising an ottoman in the seating area, wherein:
the stairway platform is formed by a cover panel of the ottoman in the seating area; or
the first support-element portion is formed by a rear wall of the ottoman in the seating area.

18. The passenger cabin area of claim 10, wherein the stairway elements comprise a privacy screen element, which forms an angle of to 110° with the second support-element portion.

19. The passenger cabin area of claim 10, wherein:
the stairway elements comprise a first privacy screen element and a stairway platform;
the first privacy screen is positioned adjacent to the aisle, in a position closer to the aisle than the first and second support-element portions;
the first privacy screen extends in the vertical direction;
the first privacy screen is substantially parallel to the second support-element portion;
the first support-element portion, the second support-element portion, and the stairway platform define a region in which an ottoman is formed in the seating area; and
an outer lateral wall of the ottoman is formed by a portion of the first privacy screen, the outer lateral wall of the ottoman being closer to the aisle than the inner lateral wall of the ottoman.

20. The passenger cabin area of claim 19, wherein:
the stairway elements comprise a second privacy screen element;
the second privacy screen element extending between the second support-element portion and the first privacy screen to at least partially enclose a space between the first privacy screen, the second privacy screen, the second support-element portion, and the stairway platform; and
the steps attached to the second support-element portion extend away from the second support-element portion to protrude into the space.

* * * * *